United States Patent
Kamath et al.

(10) Patent No.: US 11,630,797 B2
(45) Date of Patent: Apr. 18, 2023

(54) DETECTION OF A POWER STATE CHANGE IN A SERIAL BUS REPEATER

(71) Applicant: Texas Instruments Incorporated, Dallas, TX (US)

(72) Inventors: Anant Shankar Kamath, Bengaluru (IN); Rakesh Hariharan, Bengaluru (IN); Vivekkumar Ramanlal Vadodariya, Bengaluru (IN); Soumi Paul, New Delhi (IN); Mayank Garg, Ambala (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/341,089

(22) Filed: Jun. 7, 2021

(65) Prior Publication Data
US 2022/0391345 A1    Dec. 8, 2022

(51) Int. Cl.
*G06F 13/42* (2006.01)
*G06F 1/3215* (2019.01)
*G06F 13/38* (2006.01)

(52) U.S. Cl.
CPC ........ *G06F 13/4282* (2013.01); *G06F 1/3215* (2013.01); *G06F 13/382* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 6,650,149 B1 * | 11/2003 | Wong | H03K 19/007 327/14 |
| 7,986,159 B1 | 7/2011 | Ahmad et al. | |
| 8,982,746 B2 * | 3/2015 | Chen | G06F 13/4027 370/293 |
| 2014/0003306 A1 | 1/2014 | Huimin et al. | |
| 2016/0342492 A1 * | 11/2016 | Chen | G06F 13/385 |
| 2020/0125527 A1 * | 4/2020 | Maung | G06F 1/3209 |
| 2020/0304088 A1 | 9/2020 | Khan | |

OTHER PUBLICATIONS

International Search Report in corresponding PCT Application No. PCT/US2022/032422, dated Sep. 28, 2022 (5 pages).

* cited by examiner

*Primary Examiner* — Henry Tsai
*Assistant Examiner* — Dean Phan
(74) *Attorney, Agent, or Firm* — Valerie M. Davis; Frank D. Cimino

(57) ABSTRACT

A bus repeater includes first and second bus ports, a first termination resistor network coupled to the first bus port, a second termination resistor network coupled to the second bus port, and a power state change detection circuit coupled to the second bus port. The power state change detection circuit is configured to detect a power state change initiated by a device coupled to the first bus port. The detection of the power state change includes a determination that a voltage on the second bus port exceeds a threshold. Responsive to detection of the power state change, the power state change detection circuit is configured cause a change in a configuration of at least one of the first or second termination resistor networks.

20 Claims, 8 Drawing Sheets

DETECTION OF A POWER STATE CHANGE IN A SERIAL BUS REPEATER

CROSS-REFERENCE TO RELATED APPLICATIONS

This application contains subject matter which may be related to subject matter contained in U.S. patent application Ser. No. 16/433,661, filed on Jun. 6, 2019 and entitled "Serial Bus Repeater With Low Power State Detection", which is hereby incorporated by reference in its entirety.

BACKGROUND

Serial buses, such as the Universal Serial Bus (USB), are widely used to interconnect devices. The expansion of USB has resulted in a wide variety of USB devices with varying power requirements. To reduce the power consumed by operation of USB devices, the devices may implement power management in accordance with, for example, the link power management specification of the USB standard (e.g., USB 2.0), which is hereby incorporated by reference in its entirety. Link power management defines a reduced power state (a sleep state) that can be quickly (e.g., tens of microseconds) negotiated between devices connected via USB.

SUMMARY

In at least one example, a bus repeater includes first and second bus ports, a first termination resistor network coupled to the first bus port, a second termination resistor network coupled to the second bus port, and a power state change detection circuit coupled to the second bus port. The power state change detection circuit is configured to detect a power state change initiated by a device coupled to the first bus port. The detection of the power state change includes a determination that a voltage on the second bus port exceeds a threshold. Responsive to detection of the power state change, the power state change detection circuit is configured cause a change in a configuration of at least one of the first or second termination resistor networks.

In accordance with another example, a method includes, within a bus repeater, determining a timing signature of packets communicated between a first device and a second device. The method further includes determining that the timing signature matches a predetermined signature corresponding to a power state transition to a sleep state for the first and second devices. Responsive to determining that the timing signature matches the predetermined signature, the method includes enabling a comparator and then determining that a voltage on a link to one of the first or second devices exceeds a threshold. The method includes reconfiguring termination resistors within the bus repeater for the sleep state.

BRIEF DESCRIPTION OF THE DRAWINGS

For a detailed description of various examples, reference will now be made to the accompanying drawings in which.

The same reference numbers and other reference designators are used in the drawings to designate the same or similar (functionally and/or structurally) features.

DETAILED DESCRIPTION

Devices can be coupled together via serial links to exchange data and/or power. The embodiments described herein pertain to devices interconnected by a USB link. However, the embodiments may be applicable to other types of serial links besides USB. Over a USB link, a host device (e.g., a computer) is coupled to a peripheral device. Data may be exchanged between the host device and the peripheral device and/or power may be supplied by the host device to the peripheral device.

The USB specification defines a maximum cable length that can be used to interconnect devices. Cables longer than the maximum specification may result in signal degradation that may decrease slew rates leading to an increase in bit errors. A USB repeater can be coupled between two devices to alleviate this problem. For example, a USB repeater may be coupled to a host device via one USB cable and to a peripheral device via a second USB cable. The USB repeater may include edge boosters and equalizers to boost the signal strength and increase the signal-to-noise ratio (SNR) to enable the host and peripheral devices to be coupled together over a longer distance than would otherwise have been the case if the host and peripheral devices were connected together by a single USB cable.

Figure 6A:
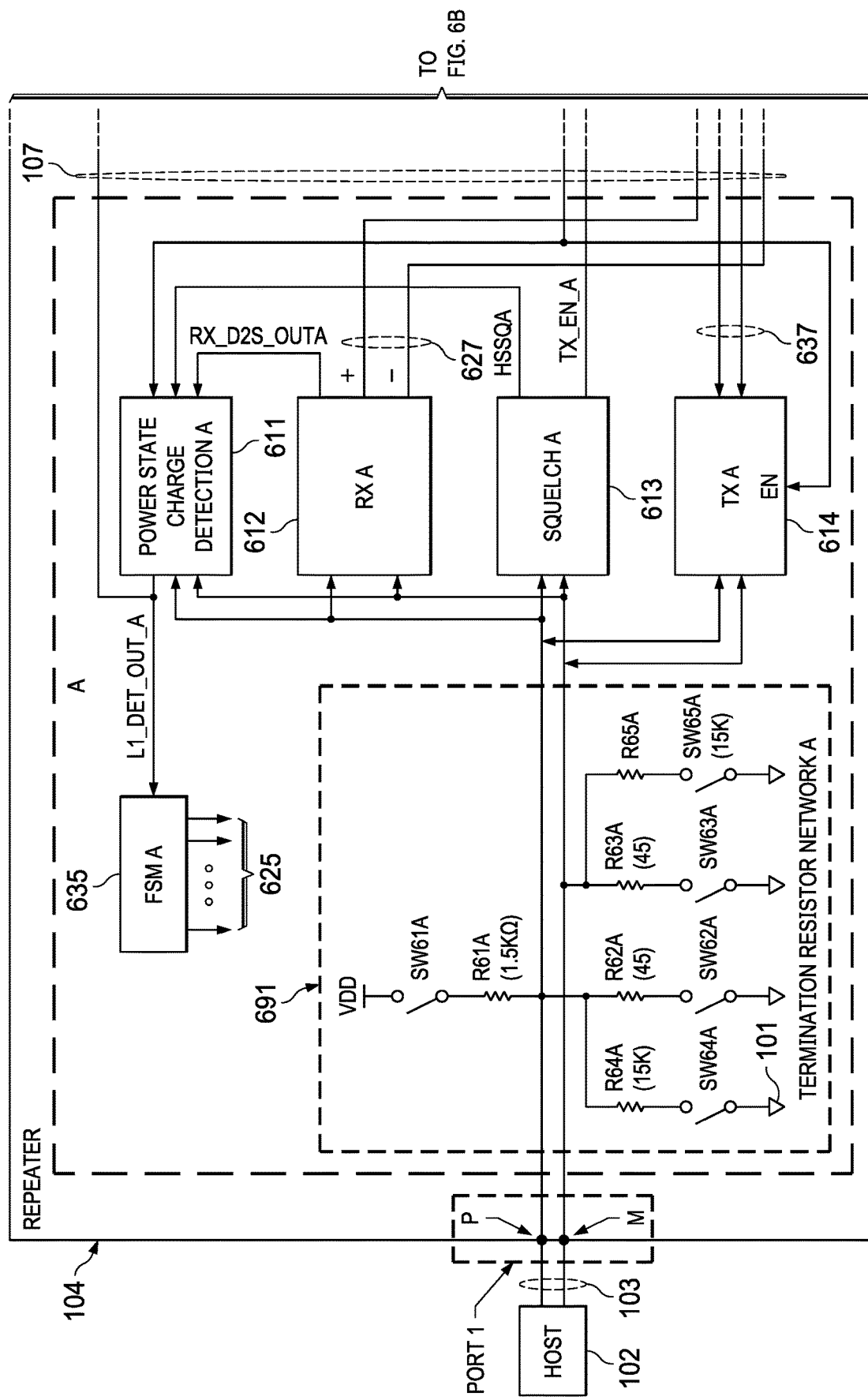
FIGS. 6A-6B shows a block diagram of the serial bus repeater including power state change detection circuits in accordance with an example embodiment.
Figure 6B:
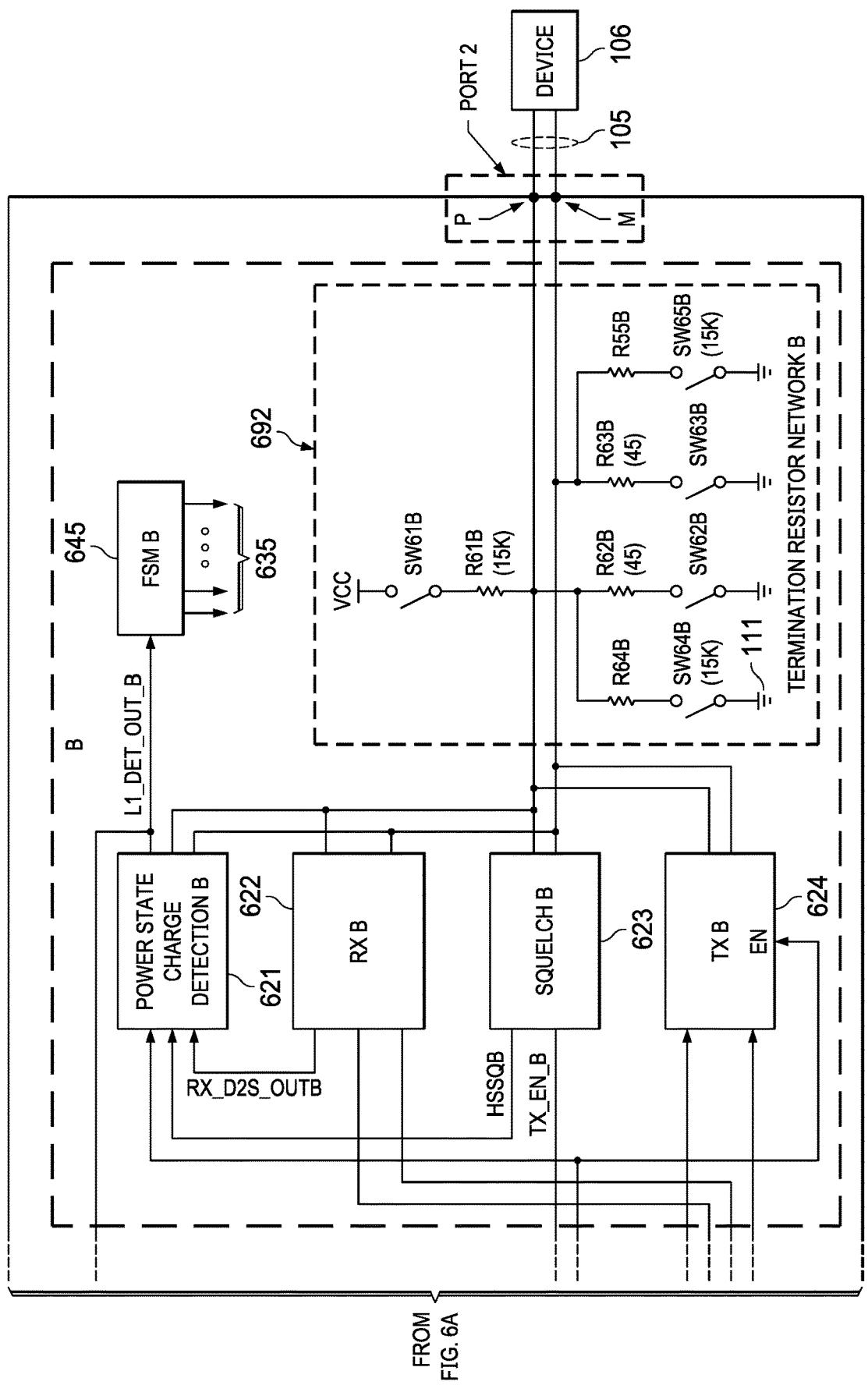

A USB repeater includes two electrical interfaces-one electrical interface connected to the host device and another electrical interface connected to the peripheral device. The electrical interfaces are such that, to the host device, the repeater operates as a peripheral device and, to the peripheral device, the repeater operates as a host device. An example implementation of a USB repeater is shown in FIG. 6 and described below.

The USB link power management (LPM) specification defines four power management states that may be implemented by a USB-compliant device. The four power management states include L0 (On), L1 (Sleep), L2 (Suspend), and L3 (Off). In the L0 state, the host and peripheral devices can operate at Low Speed (LS), Full Speed (FS), or High Speed (HS) modes. The data rate for the LS mode is 1.5 mega-bits per second (Mbps). The data rate for FS mode is 12 Mbps, and the data rate for the HS mode is 480 Mbps. The LPM specification added the L1 state to the USB specification, while the conditions corresponding to the L0, L2, and L3 states antedate the LPM specification. The L1 state is entered using multiple packets transferred between the host and the peripheral device. For example, to transition from the L0 state to the L1 state, a host device transmits two token packets (a token packet and an extended token packet) to the peripheral device, and the peripheral device receiving the token packets transmits a handshake packet back to the host to accept or reject the power state transition. Upon the peripheral device transmitting the acknowledgement (ACK) handshake packet, the peripheral device and the host enter their respective L1 states during which power consumption is reduced.

Each USB-compliant device includes termination resistors on its bus terminals. The configuration for the termination resistors for a device in the L0 state in the HS mode is different than for the same device in the L1 state. However, the configuration for the termination resistors for a device in the L0 state in the LS and FS modes is the same as the same device in the L1 state. A USB repeater must also configure its termination resistors depending on the state of the serial bus so that the repeater's termination resistor configuration on its interfaces to the host and to the peripheral device mimics that of the peripheral device and of the host device, respectively. Accordingly, the USB repeater must detect any power state change negotiated between host and peripheral device. The embodiments described herein pertain to a USB repeater that detects an L0 to L1 state change for devices that were operating in the HS mode during the L0 state prior to transitioning to the L1 state. Accordingly, the references below to the L0 state means that the device is operating in the HS mode while in the L0 state.

A USB repeater could be implemented to detect a transition of the host and peripheral devices from the L0 state to the L1 state by decoding the packets transmitted between the host and peripheral device to identify an LPM transaction. However, packet decoding requires that the repeater include an accurate clock source, a phase-locked-loop (PLL), clock and data recovery (CDR) circuitry, and other expensive circuitry that increases the size and cost of the repeater.

The USB repeater disclosed herein identifies an L0-to-L1 power state transition without the use of a PLL, CDR circuitry, or decoding of the packets associated with an LPM transaction. Instead, the USB repeater of some example embodiments identifies an L0 to L1 power state transition by detecting the possible occurrence of a sequence of packets that represents a request for a power state transition. In one embodiment, the detection is made by measuring the time duration of each packet passing through the repeater and comparing the time durations of the packets to the known time durations of the particular packets that define a request for a power state transition (e.g., the token, extended token, and handshake packets). However, other sequences of packets may have the same or similar time durations. Accordingly, detection of a sequence of packets that match the time durations of the token, extended token, and handshake packets is indicative of, but not necessarily guaranteed to be, an L0-to-L1 power state transition. For this reason, the repeater of some example embodiments performs a second step to confirm the power state transition.

In some example embodiments, after identifying a possible power state transaction, the repeater compares the differential voltage on its serial bus link to the peripheral device to a threshold. Upon the peripheral device transmitting its handshake packet to complete the packet sequencing for the power state transition, the peripheral device reconfigures its bus termination resistors to the FS mode, which will result in an increase in the idle mode differential voltage on the bus link. The repeater confirms the detection of the possible power state transition (resulting from a determination of the time periods of the packets defining the power state transition) upon determining that the differential bus voltage exceeds the threshold. Upon performing both steps (determination of time periods of a sequence of packets indicating a possible power state transition and determining that the peripheral bus voltage exceeds the threshold), the repeater reconfigures its own termination resistors to comply with the newly detected power state.

Figure 1:
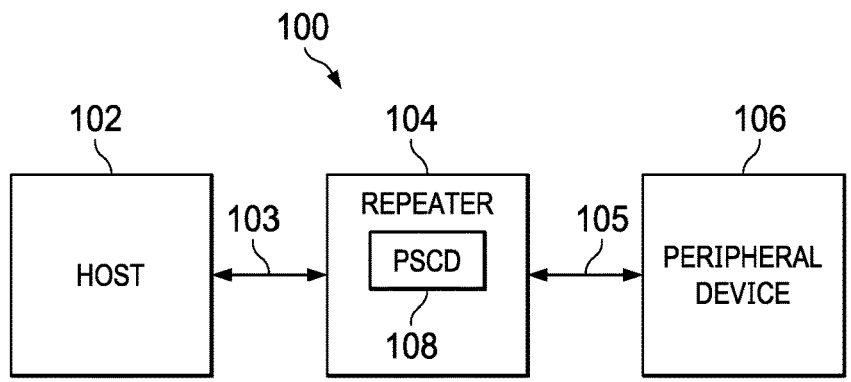
FIG. 1 shows a block diagram of an example serial bus system that includes a repeater with a power state change detection circuit in accordance with the present disclosure.

FIG. 1 shows a block diagram for an example serial bus system 100 that includes a serial bus repeater 104 (e.g., a USB repeater) coupled between a host 102 and a peripheral device 106. The host 102 initiates communications with the peripheral device 106. The role of "host" and "peripheral device" can be reversed. That is, the device that is shown as host 102 in FIG. 1 can also function as a peripheral device, while the device shown as peripheral device 106 can also function as the host. In some embodiments, the devices are capable of role reversal. The link 103 between the host 102 and the serial bus repeater 104 is a serial bus (e.g. a USB link). Similarly, the link 105 between the serial bus repeater 104 and the peripheral device 106 is a serial bus (e.g. a USB link). The host 102 and the peripheral device 106 communicate via the serial bus repeater 104. In one example, the serial bus system 100 is a USB 2.0 system in which the host 102 is a USB 2.0 host, the peripheral device 106 is a USB 2.0 device, and the serial bus repeater 104 is a USB 2.0 repeater. In some implementations of the serial bus system 100, the serial bus repeater 104 electrically isolates the host 102 and the peripheral device 106. In other implementations of the serial bus system 100, the serial bus repeater 104 does not electrically isolate the host 102 and the peripheral device 106. The serial bus repeater 104 receives, conditions, and retransmits signals received from the host 102 or the peripheral device 106. Some implementations of the serial bus repeater 104 do not decode the data packets received from the host 102 or the peripheral device 106.

The serial bus repeater 104 includes a power state change detection (PSCD) circuit 108. The power state change detection circuit 108 identifies a transition to a reduced power state in the serial bus system 100 without decoding the packets transmitted via the serial bus. As each packet on the serial bus passes through the serial bus repeater 104, the power state change detection circuit 108 identifies a series of sequential packets that are possibly indicative of, but not necessarily guaranteed to be, a power state change transaction. An example of how the power state change detection 108 detects an occurrence of such a sequence of packets is based on the time duration of the packets and is explained below regarding FIGS. 5 and 6. That the time duration of each packet of a sequence of packets matches the expected time durations of packets corresponding to, for example, an L0-to-L1 power state change indicates that the sequence of packets possibly is that of a power state change. However, the sequence packets could be for a different purpose but that happens to have similar time durations.

When a series of packets indicative of a possibly change in power state is identified, the power state change detection circuit 108 determines whether the voltage on the USB link between the repeater 104 and the peripheral device 106 is above a threshold as a way to confirm that the packets are to change the power state between the host and the peripheral device. In one example the USB link implements differential signaling including a Plus (P) data line and a Minus (M) data line. The USB link voltage being compared to the threshold is the voltage difference between the P and M data lines, that is, the differential voltage on the USB link between the repeater 104 and the peripheral device 106. The link voltage being above the threshold confirms that there has been a change in the power state of the serial bus system 100 (e.g., a change from the USB L0 state (On) in the HS mode to the USB L1 state (Sleep)). The power state change detection circuit 108 reacts to this confirmation by reconfiguring the termination resistors within the serial bus repeater 104 for the newly detected power state (e.g., the L1 state). On the other hand, the bus voltage not being above the threshold indicates that there has not been a change in the power state, and the power state change detection circuit 108 does not change its termination resistors. Accordingly, the power state change detection circuit 108 within the serial bus repeater 104 reconfigures its termination resistors when two conditions are determined to be true: (1) that a series of packets indicative of a change in power state has been detected and (2) that the differential link voltage exceeds the threshold.

Figure 2:
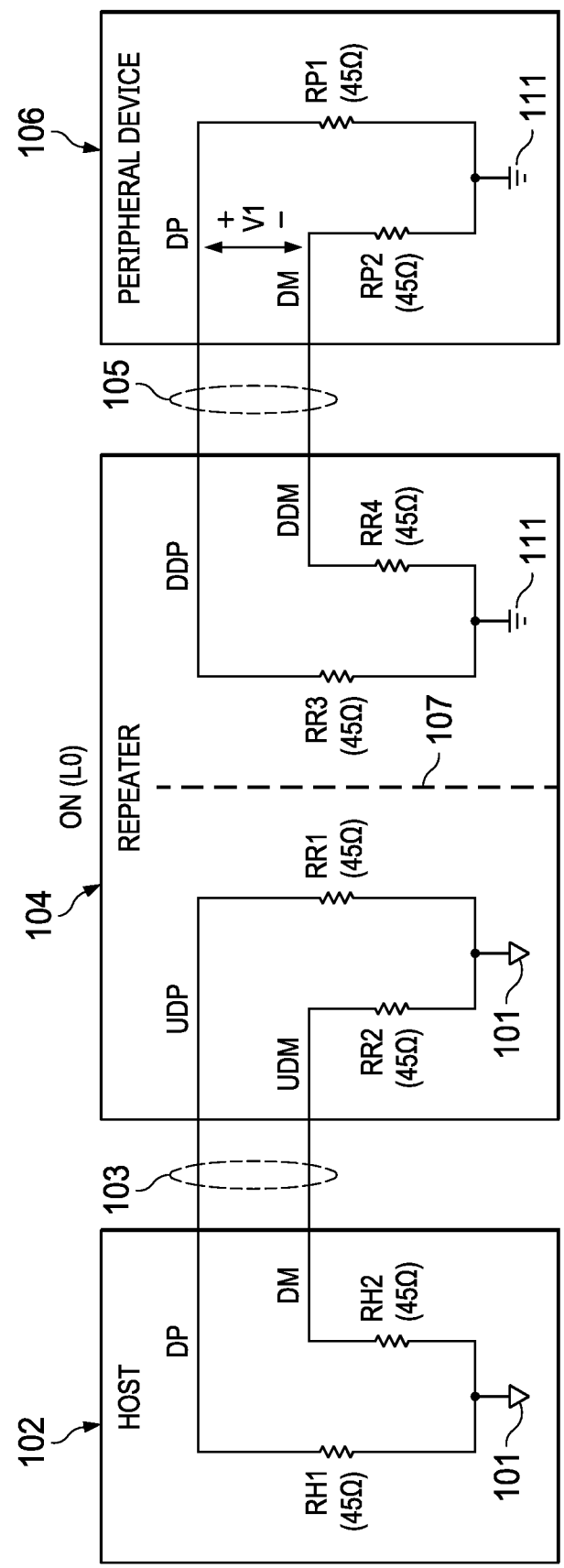
FIG. 2 shows a block diagram of the serial bus system in which the termination resistors for the host, repeater, and device are configured for a USB High Speed L0 (On) state.

FIG. 2 illustrates the serial bus repeater 104 coupled between the host 102 and the peripheral device 106. In some example embodiments, serial bus repeater 104 includes isolation 108 (such as a transformer, capacitive isolation or any other type of galvanic isolation) to isolate voltages (and, possibly, ground) on the host side of serial bus repeater 104 from voltages (and, possibly, ground) on the peripheral devices side of serial bus repeater 104. The link 103 between the host 102 and the serial bus repeater 104 includes P and M data lines. The host 102 includes a Data Plus (DP) terminal and a Data Minus (DM) terminal. The peripheral device 106 has a correspondingly named pair of data terminals (DP and DM). The serial bus repeater 104 has two pairs of differential data terminals-one pair (UDP and UDM) for connection to the host's DP and DM terminals, respectively, via link 103 and another pair (DDP and DDM) for connection to the peripheral device's DP and DM terminals, respectively, via link 105.

According to the USB standard, a USB-compliant device (such as host 102 and peripheral device 106) configures its termination resistors for its Data Plus and Data Minus interface depending on the power state of the device. FIG. 2 illustrates the configuration of the termination resistors within the host 102, serial bus repeater 104, and the peripheral device 106 for the USB High Speed L0 state (On). For the L0 state, the host 102 causes a resistor RH1 to be coupled between its DP conductor and a signal ground 101, and causes a resistor RH2 to be coupled between its DM conductor and signal ground 101. Similarly, the peripheral device 106 causes a resistor RP1 to be coupled between its DP conductor and a signal ground 111, and causes a resistor RP2 to be coupled between its DM conductor and signal ground 111. In some example embodiments, signal ground 101 may be the same as or different than signal ground 111. The serial bus repeater 104 mirrors the termination resistor configuration of the host 102 to the peripheral device 106 and of the peripheral device 106 to the host 102. Accordingly, the serial bus repeater 104 couples resistor RR1 between UDP and ground 101 and resistor RR2 between UDM and ground 101. The serial bus repeater 104 also couples resistor RR3 between DDP and ground 111 and resistor RR4 between DDM and ground 111. The termination resistors within the host 102, serial bus repeater 104, and peripheral device 106 may be coupled to the terminals and grounds as shown by way of solid-state switches, an example of which is shown in FIG. 6 and described below. In this example, the serial bus repeater 104 electrically isolates (by isolation 107) the host 102 from the peripheral device 106 with the host 102 having a ground 101 that is not electrically connected to the ground 111 of the peripheral device 106. The serial bus repeater 104 includes both grounds 101 and 111 as shown. While in the USB High Speed L0 state (On), the termination resistors are all pull-down resistors (coupled between their respective data lines and ground) and, in at least one example, have low resistance values (e.g. approximately 45 ohms—as indicated by the resistance values in parentheses).

Figure 3:
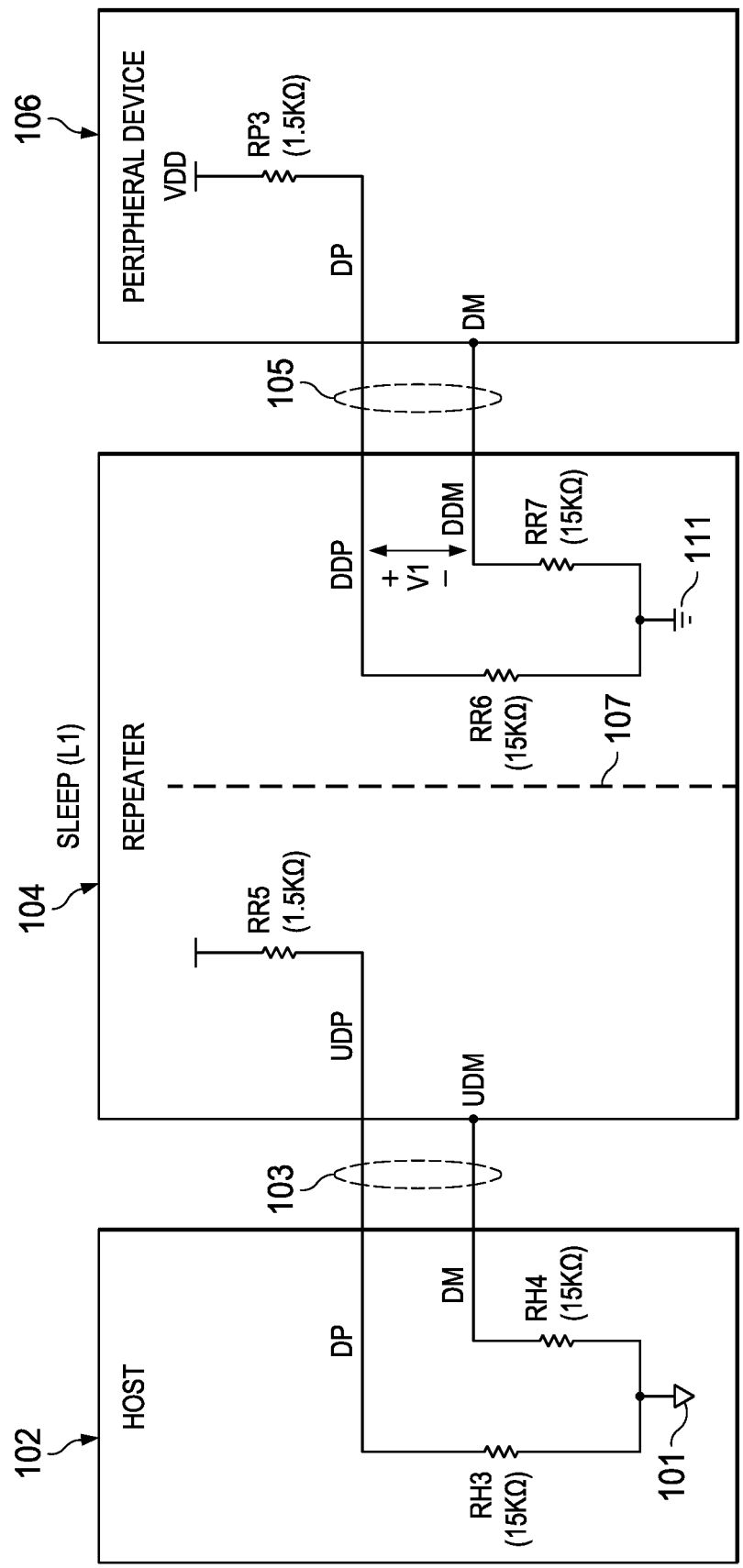
FIG. 3 shows a block diagram of the serial bus system in which the termination resistors for the host, repeater, and device are configured for a USB L1 (Sleep) state after previously being in the High Speed (or Full Speed) L0 state.

In accordance with the USB standard and as explained above, to initiate an L0-to-L1 power state change for a High Speed link (devices operating in the HS mode), a series of three packets are exchanged between the host 102 and the peripheral device 106. The host 102 transmits two token packets (a token packet and an extended token packet) and the peripheral device 106 receiving the token packets transmits a handshake packet back to the host 102 to accept or reject the power state transition. Upon the host 102 and peripheral device 106 completing the packet exchange, the host 102, serial bus repeater 104, and peripheral device 106 change their termination resistors from the configuration shown in FIG. 2 to the configuration shown in FIG. 3. In FIG. 3, the L0 state's pull-down resistors RH1 and RH2 in the host 102 have been replaced with pull-down resistors RH3 and RH4, each having a higher resistance value (e.g. approximately 15 kohm resistors instead of approximately 45 ohm resistors as in FIG. 2). Within the peripheral peripheral device 106, the DM terminal is left open (no termination resistor) and the DP terminal is coupled to VDD by a resistor RP3 (e.g., approximately 1.5 Kohm). The serial bus repeater 104 implements similar termination resistors—a resistor RP5 (e.g., approximately 1.5 kohm) coupled between UDP on the host side of the repeater (UDM left open), and pull-down resistors RR6 and RR7 (both approximately 15 kohm resistors) on the device side of the repeater.

All references herein to a termination "resistor" include a single resistor with a given resistance or a combination of resistors that have an equivalent resistance equal to the given resistance. For example, a 45-ohm resistor may be implemented as a single 45-ohm resistor, a pair of 90-ohm resistors coupled in parallel, or any other serial and/or parallel combination of resistors that equals the desired termination resistance.

Figure 4:
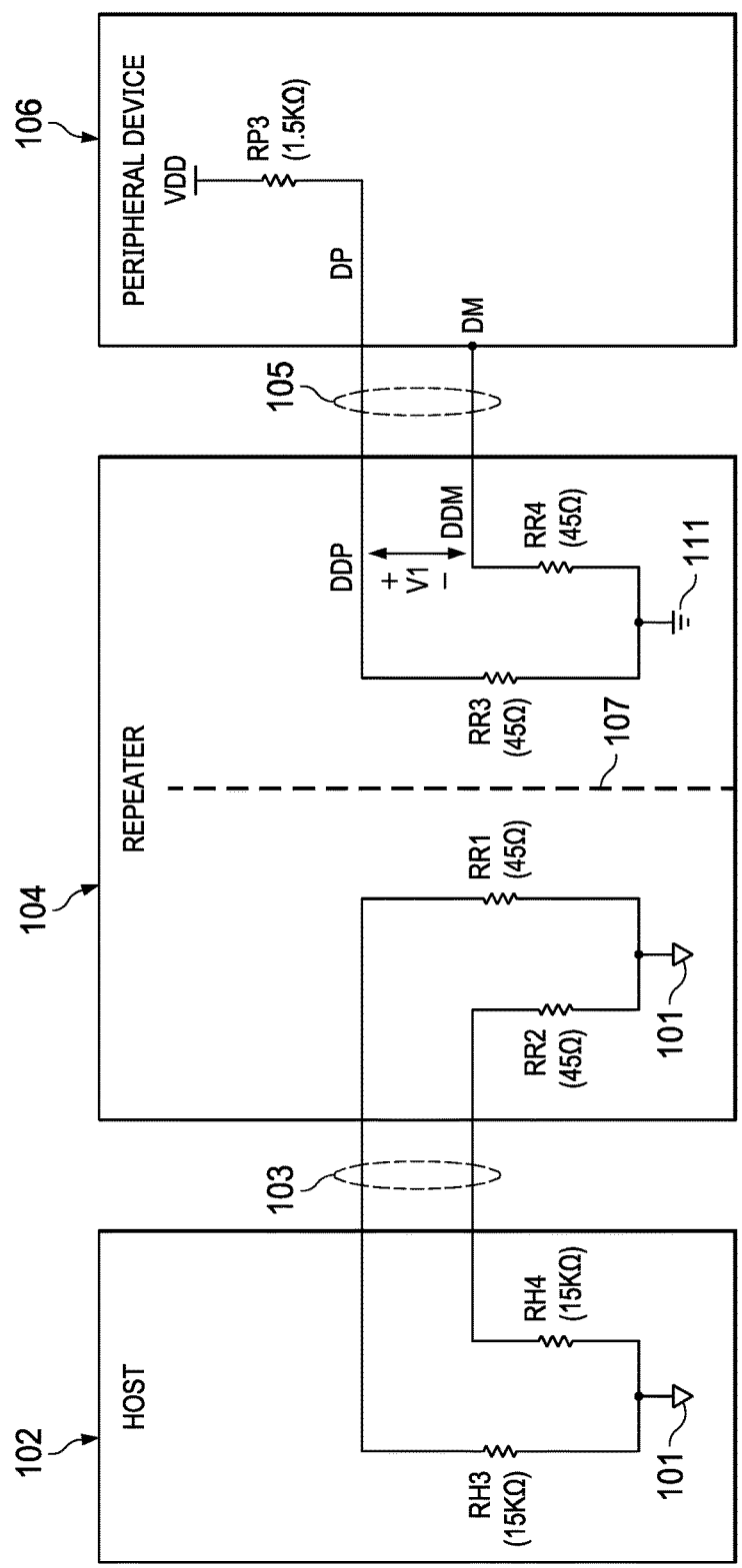
FIG. 4 shows a block diagram of the serial bus system in which the termination resistors for the host and device are configured for the USB L1 state after previously being in the High Speed (or Full Speed) L0 state, but the termination resistors for the repeater are still configured for the USB High Speed L0 state.

The serial bus repeater 104 in this embodiment does not decode the packets and passes the signals back and forth between host 102 and peripheral device 106 (while providing signal conditioning). Accordingly, until the serial bus repeater 104 is able to determine that an L0-to-L1 state change has occurred, the termination resistors for the serial bus repeater remains in the L0 configuration. This interim configuration is shown in FIG. 4 in which the host 102 and peripheral device 106 have reconfigured their termination resistors for the L1 state, but the serial bus repeater 104's termination resistors remain as pull-down resistors RR1-RR4 (e.g., 45 ohms) which had been implemented in the High Speed L0 state (FIG. 2).

In the L0 state (FIG. 2), with termination resistors coupled between their respective data lines and ground and with no active data being transmitted between the host 102 and the peripheral device 106, the voltage difference V1 between the plus and minus data lines of link 105 is approximately 0 V. Similarly, the voltage difference between the plus and minus data lines of link 103 is approximately 0 V. However, the magnitude of voltage V1 between the plus and minus data lines of link 105 with the termination resistors of the repeater 104 in the L0 configuration and the termination resistors of the peripheral device 106 in the L1 state (the interim state of FIG. 4) is larger than the magnitude of V1 when both the repeater's and device's termination resistors are in the L0 state (FIG. 2). With the termination resistors in the configuration of FIG. 4, the voltage on DDM with respect to ground 111 is 0 V. Resistors RP3 and RR3 form a voltage divider between VDD and ground 111, and thus the voltage on DDP with respect ground 111 is VDD*RR3/(RR3+RP3). With VDD at, for example, 3.3V, the resistance of RP3 equal to 1.5 Kohms, and the resistance of RR3 equal to 45 ohms, the voltage on DDP with respect to ground 111 is 3.3*45/(45+1500), which equals approximately 96 mV. Thus, with the serial bus system 100 in the L0 state (FIG. 2), V1 equals 0 V, but with the serial bus system 100 in the interim state of FIG. 4, V1 equals approximately 96 mV. As explained below, the power state change detection circuit 108 monitors the voltage V1 on the link 105 between the serial bus repeater 104 and the peripheral device 106. Following a determination of a potential power state change based on detecting that the time duration of a sequence of packets between the host 102 and the peripheral device 106 matches that of the token, extended token, and handshake packets, the power state change detection circuit 108 uses the magnitude of voltage V1 to confirm the power state change-0V indicates an absence of a power state change and a voltage of approximately 96 mV indicates the presence of a power state change.

Figure 5:
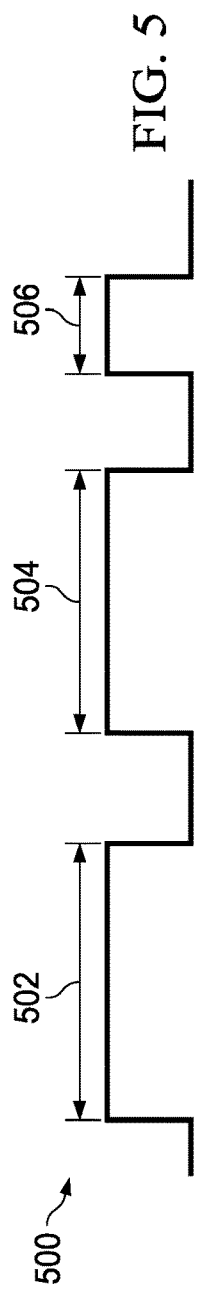
FIG. 5 shows an example of packet timing for a power state transaction on a serial bus.

As described above, the serial bus repeater's power state change detection circuit 108 measures the time duration of each packet passing through the repeater. Each packet of a sequence of packets that correspond to the host 102 initiating an L0-to-L1 power state change will have a particular time duration that is a function of the length (e.g., number of bytes) of the respective packet. FIG. 5 shows an example of packet timing 500 for a power state transaction on the serial bus. In FIG. 5, the power state transaction includes packet 502, packet 504, and packet 506. The packet 502 is a token packet transmitted by the host 102, the packet 504 is an extended token packet transmitted by the host 102, and the packet 506 is a handshake packet transmitted by the peripheral device 106 responsive to receipt of packets 502 and 504. Packets 502 and 504 are of equal length (e.g., each is 3 bytes in length), and the packet 506 is one byte in length as provided by the USB 2.0 specification and the LPM addendum thereto. The power state change detection circuit 108 measures the time duration of each of packets 502, 504, and 506, as well as all other packets received by the serial bus repeater 104. Upon detecting three back-to-back packets that have the time durations that match the expected time durations of a token packet, an extended token packet, and an acknowledgment packet, the power state change detection circuit 108 asserts a signal which indicates that a possible L0-to-L1 power state change is occurring. This signal, in turn, causes the termination resistors within the serial bus repeater 104 to be reconfigured for the newly detected (e.g., L1) power state.

However, other packets may have similar time durations as the token, extended token, and handshake packets 502, 504, and 506, and thus a risk of a false positive exists. For this reason, the power state change detection circuit 108 determines whether the voltage V1 between the plus and minus conductors of link 105 (on the peripheral device 106 side of the serial bus repeater 104) exceeds a threshold indicative of the voltage state of V1 illustrated in FIG. 4. The threshold may be set at a voltage above 0V but below the expected level of V1 with the system in the interim state of FIG. 4. When the system is in the interim state of FIG. 4, voltage V1 may be between, for example, 70 mV and 195 mV depending on the exact resistance values of resistors RR3 and RP3 and the voltage level of VDD. In one example, the threshold voltage is set at 50 mV. If voltage V1 is determined to be below the threshold, then the power state change detection circuit 108 determines that a power state change has not occurred (the sequence of three packets were not packets corresponding to an L0-to-L1 power state change), and the termination resistors for the repeater are not changed (and thus remain at the L0 configuration and values shown in FIG. 2). However, voltage V1 exceeding the threshold is a confirmation of a power state change, and the power state change detection circuit 108 asserts control signals to cause a change in the termination resistors for the repeater 104 from that shown in FIG. 4 to that shown in FIG. 3.

FIG. 6 is a block diagram illustrating one possible implementation of the serial bus repeater 104 including an "A" portion and a "B" portion. The A portion includes a first port Port1 that has Plus (P) and Minus (M) terminals. Similarly, the B portion includes a second port Port2 that has P and M terminals. The A portion includes a power state change detection circuit A 611, a receiver A 612, a squelch A circuit 613, a transmitter A 614 (the letter "A" indicates that these are components of the A portion of the repeater), and a finite state machine (FSM) 635. Similarly, the B portion includes a power state change detection circuit B 621, a receiver B 622, a squelch B circuit 623, a transmitter B 624, and an FSM 645. The serial bus repeater thus has a symmetrical architecture that permits either pair of its P/M data terminals to be connected via a cable to either a host device or a peripheral device. The A portion can be connected to a host and the B portion can be connected to a peripheral device, or the B portion can be connected to a host and the A portion can be connected to a peripheral device. The isolation 107 described above is shown in dashed outline.

Each portion A and B has a termination resistor network. Portion A has a termination resistor network A 691. Portion B has a termination resistor network B 692. The termination resistor network A 691 includes resistors R61A-R65A (illustrative resistances listed in parentheses). Each resistor is coupled to a switch. Switch SW61A and resistor R61A are coupled in series between the A portion's supply voltage VDD and the P terminal. With switch SWB1A closed (on), resistor R61A electrically is a pull-up resistor on the P line. Resistor R64A and switch SW64A are coupled in series between the P line and ground 101 and thus is configurable as a pull-down resistor when switch SW64A is closed. Resistor R62A and switch SW62A are coupled in series between the P terminal and ground 101. Resistor R63A and switch SWB63A are coupled in series between the M terminal and ground 101. Similarly, resistor R65A and switch S65A are coupled in series between the M terminal and ground 101.

The termination resistor network B 692 of the repeater 104 includes a similar set of termination resistors and switches (compared to termination resistor network A 691) with illustrative resistances listed in parentheses. Switch SW61B and resistor R61B are coupled in series between supply voltage VCC (which is isolated from VDD) and the B portion's P terminal. Resistor R64B and switch SWV64B are coupled in series between the P terminal of the B portion and ground 111. Resistor R62B and switch SW62B are coupled in series between the P terminal of the B portion and ground 111. Resistor R63B and switch SW63B are coupled in series between the M terminal of the B portion and ground 111. Similarly, resistor R65B and switch SW65B are coupled in series between the M terminal and ground 111.

The FSMs control the configuration of the respective termination resistor networks A and B. Within the A portion, the on and off states of switches SW61A-SW65A within the termination resistor network A are controlled by the FSM A 635. Within the B portion, the on and off states of switches SW61B-SW65B within the termination resistor network B are controlled by the FSM B 645. Although two power state change detection circuits are shown, in the example embodiment illustrated in FIG. 6, only one of the power state change detection circuits is enabled at any point in time. For example, each FSM samples the differential voltage on its respective link (FSM A 635 samples link 103, and FSM B 645 samples link 105) to determine which port is connected to a host (the differential voltage on a link to a host is different than the differential voltage on a link to a peripheral device). The FSM that detects the presence of a host to its link disables the respective power state change detection circuit, and the FSM that does not detect the presence of a host enables its respective power state change detection circuit. The power state change detection circuit that is enabled is in the opposite portion A or B from where the host 102 is coupled. For example, with the host 102 coupled to the A portion, the power state change detection circuit A 611 is disabled, and the power state change detection circuit B 621 is enabled. However, if the host 102 and peripheral device 106 were swapped from that shown in FIG. 6 (host 102 coupled to the B portion), the power state change detection circuit A 611 is enabled and the power state change detection circuit B 621 is disabled. When enabled and as described below, a given power state change detection circuit generates an L1 detect signal responsive to detecting whether the host and peripheral devices are configured for the L0 state or the L1 state. The L1 detect signal from the power state change detection circuit 611 is labeled L1_DET_OUT_A, and the L1 detect signal from the power state change detection circuit B 621 is labeled L1_DET_OUT_B. Both FSMs A and B receive the L1 detect signal from the power state change detection circuit that is enabled and configure their respective termination resistor networks in accordance with the detected power state (L0 or L1).

In the example of FIG. 6, the host 102 is connected to Port1 of the A portion of the repeater 104 and the peripheral device 106 is connected to Port2 of the B portion. With the peripheral device 106 connected to the B portion, the B portion's power state change detection circuit B 621 detects the occurrence of a power state change (e.g., L0 to L1) and responds to the detected power state change by asserting its L1_DET_OUT_B signal (e.g., logic high) to the FSMs A and B to thereby control the respective termination resistors' switches to configure the termination resistor network of the repeater for termination resistance in compliance with the newly detected power state. The following discussion thus focuses on the functionality performed by the power state change detection B circuit 621. However, if the host 102 and peripheral device 106 were connected to the opposite portions of the repeater 104, the power state change detection A circuit 611 would perform the same functionality.

When the host 102 sends a packet to the peripheral device 106, the packet is received by receiver RX A 612 of the repeater. The receiver RX A 612 includes an equalizer, amplifier, and differential-to-serial converter and outputs a differential signal 627 to the transmitter TX B 624. The transmitter TX B 624 includes an amplifier and pre-emphasizer and forwards the amplified differential signal to the peripheral device 106 over link 105. Similarly, a packet from the peripheral device 106 to the host 102 is received by the receiver RX B 622, processed in much the same as for receiver RX A 612 and the output of receive RX B 622 is provided to transmitter TX A 614 as a differential signal 637, which is forwarded to the host 102 by the transmitter TX A 614.

Receiver RX A 612 also generates a single-ended output signal RX_D2S_OUTA derived from the received differential signal on link 103. The signal RX_D2S_OUTA is the same as the differential signal on link 103 but in single-ended form. The single ended-output signal RX_D2S_OUTA is referenced to ground 101. The output signal RX_D2S_OUTA is provided to the power stage change detection A circuit 611. Similarly, receiver RX B 622 generates a single-ended output signal RX_D2S_OUTB derived from the received differential signal on link 105 and referenced to ground 111. The output signal RX_D2S_OUTB is provided to the power stage change detection B circuit 621.

In one embodiment, each squelch A circuit 613 and squelch B circuit 623 includes an envelope detector that generates a squelch signal (HSSQ) on its output responsive to the magnitude of the detected envelope on its input exceeding a predetermined voltage. Each squelch circuit includes, for example, differential comparators, level shifters, and filters. The output signal from the squelch A circuit 613 is HSSQA, and the output signal from the squelch B circuit 623 is HSSQB. In one example, the HSSQA signal is asserted low (e.g. a logic "0") by the squelch A circuit 613 responsive to detection of the envelope on its input (Port1) being in excess of a threshold (e.g., 0.5 V), and otherwise is forced high (e.g. a logic "1") by the squelch A circuit 613 (when no signal is detected). Similarly, the HSSQB signal is asserted low (e.g. a logic "0") by the squelch B circuit 623 responsive to detection of the envelope on its input (Port2) being in excess of the threshold, and otherwise is forced high (e.g. a logic "1") by the squelch B circuit 623. The HSSQA signal from the squelch A circuit 613 is provided to the power state change detection A circuit 611, and the HSSQB signal from the squelch B circuit 623 is provided to the power state change detection B circuit 621.

Each squelch circuit also generates a transmit enable signal to enable the opposite portion's transmitter upon detection of an input signal (e.g., the envelope of the input signal being in excess of the threshold). The squelch A circuit 613 generates a signal TX_EN_A which is coupled to the transmitter TX B 624, as well as to the power state change detection circuit B 621. The squelch B circuit 623 generates a signal TX_EN_B which is coupled to the transmitter TX A 614, as well as to the power state change detection circuit A 611.

The power state change detection circuit A 611 is coupled to the P and M lines of the link 103. Further, the power state change detection circuit A 611 receives the control signals HSSQA from the squelch A circuit 613, RX_D2S_OUTA from the receiver RX A 612, and the transmitter enable signal TX_EN_B from the squelch B circuit 623. The power state change detection circuit B 621 is coupled to the P and M lines of the link 105 and receives the control signals HSSQB from the squelch B circuit 623, RX_D2S_OUTB from the receiver RX B 622, and the transmitter enable signal TX_EN_A from the squelch A circuit 613.

Figure 7:
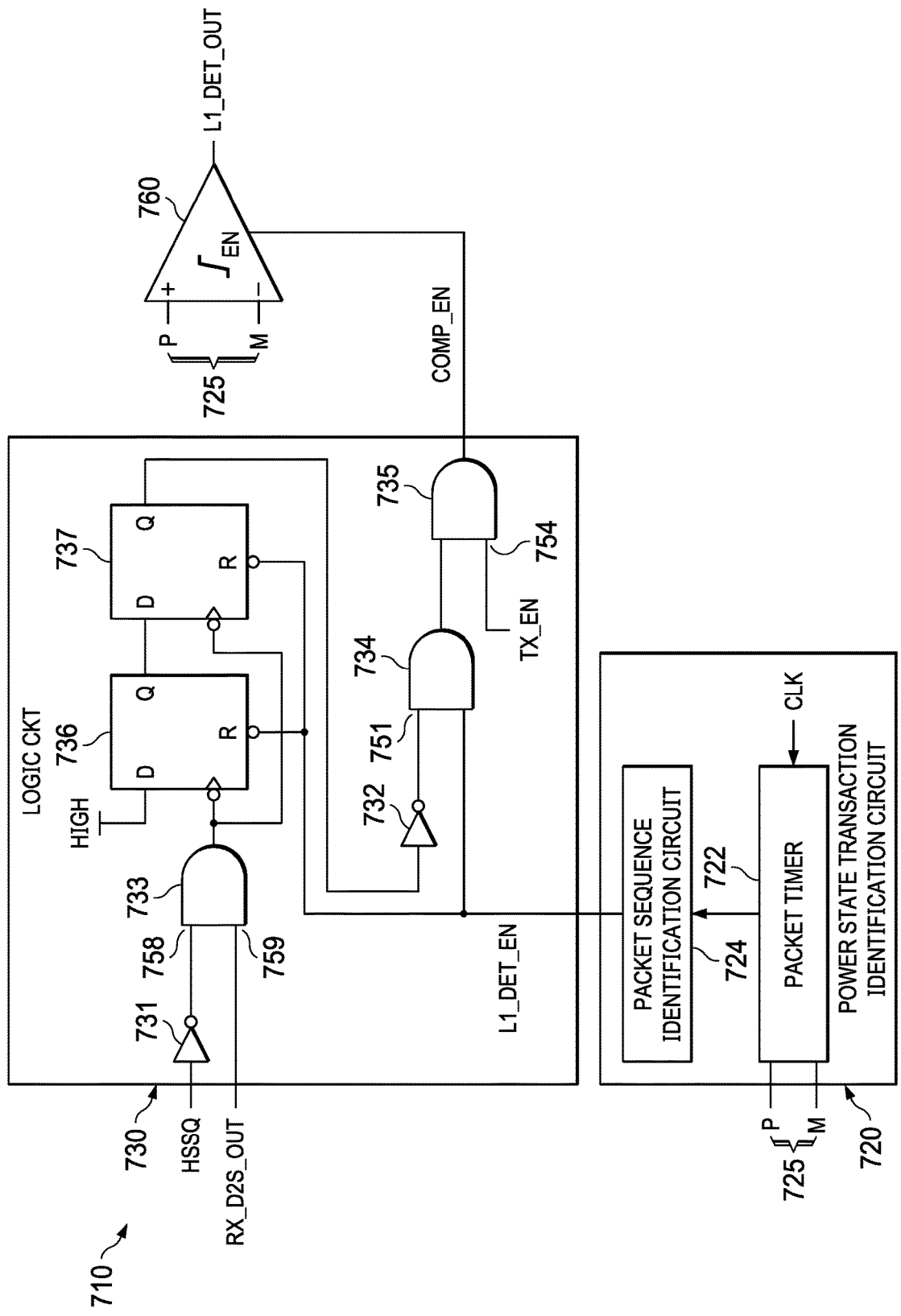
FIG. 7 shows a circuit schematic of the power state change detection circuit in accordance with example embodiment.

FIG. 7 is a schematic of an example implementation of a power state change detection circuit 710. Either or both of the power state change detection A and B circuits 611 and 621 can be implemented with the circuit shown in FIG. 7. The example power state change detection circuit 710 includes a power state transaction identification circuit 720, a logic circuit 730, and a comparator 760. The power state transaction identification circuit 720 includes a packet timer 722 coupled to a packet sequence identification circuit 724. The input of the packet timer 722 is coupled to a differential link 725 (e.g., link 105 (Port2) in the case of the power state change detection B circuit 621 or link 103 (Port1) in the case of the power state change detection A circuit 611).

The comparator 760, which may be implemented as an operational-amplifier in an open loop configuration, has a non-inverting (positive, +) input and an inverting (negative, −) input. The positive input of comparator 760 is coupled to the P line of differential link 725, and the negative input of comparator 760 is coupled to the M line of differential link 725. The comparator 760 has an enable input (EN) which receives an output signal COMP_EN from the logic circuit 730. When enabled (e.g., by a logic high level of signal COMP_EN), the comparator 760 generates an output signal L1_DET_OUT indicative of whether the voltage on the positive input of the comparator 760 is larger or smaller than the voltage on the negative input. The comparator 760 is configured with a threshold voltage level (e.g. the offset of comparator 760 corresponds to the threshold voltage discussed above), which means that the comparator 760 asserts output signal L1_DET_OUT logic high responsive to the voltage on the positive input being more than the threshold voltage greater than the voltage on the negative input. The comparator 760 asserts output signal L1_DET_OUT logic low responsive to the voltage on the positive input not being more than the threshold voltage greater than the voltage on the negative input. The threshold voltage configured for the comparator 760 is a voltage that is less than the differential voltage between the P and M lines of differential link 725 when the system is in the interim state illustrated in FIG. 4. In one example, the differential voltage on the link between the repeater 104 and the peripheral device 106 is between 70 mV and 195 mV and the threshold voltage (e.g. offset) implemented within the comparator 760 is 50 mV.

In the example of FIG. 7, the logic circuit 730 includes inverters 731 and 732, AND gates (or other types of logic gates) 733, 734, and 735, and D-flip-flops 736 and 737. The input of inverter 731 receives the HSSQ signal (HSSQA or HSSQB as described above). An input 758 of AND gate 733 is coupled to the output of inverter 731 and thus receives a logically-inverted version of HSSQ. The other input 759 of AND gate 733 receives the signal RX_D2S_OUT. The D input of flip-flop 736 is tied to logic high, and the Q output of flip-flop 736 is coupled to the D input of flip-flop 737. When reset, the Q outputs of both flip-flops are logic low. An inverted version of the L1_DET_EN signal from the power state transaction identification circuit 720 is coupled to the reset (R) inputs of the flip-flops 736 and 737. With the L1_DET_EN signal held low, the Q outputs of the flip-flops are logic low because the flip-flops 736 and 737 are reset. When L1_DET_EN signal is high (and the inverted version of this signal is provided to the reset input of flip-flops 736 and 737) and the flip-flops are clocked twice (e.g. the first clock propagates the logic high signal through flip-flop 736 and the second propagates the logic high signal through the second flip-flop 737), the logic high on the D input of flip-flop 736 propagates through the flip-flops to the Q output of flip-flop 737. Logic circuit 730 can be implemented with other combinations of logic gates and flip-flops.

The Q output of flip-flop 737 is coupled to an input of inverter 732. The output of inverter 732 is coupled to an input 751 of AND gate 734. As is explained below, the power state transaction identification circuit 720 generates a logic high on its output signal L1_DET_EN responsive to the power state transaction identification circuit 720 detecting the occurrence of three sequential packets between the host 102 and peripheral device 106 that each have a time duration corresponding to an expected time duration for power state transition from the L0 to L1 state. The power state transaction identification circuit's output signal L1_DET_EN enables the comparator 760 when L1_DET_EN is high and disables the comparator 760 when L1_DET_EN is low. As explained below, the logic circuit 730 gates off the L1_DET_EN to prevent the comparator 760 from being enabled when signaling is detected on the serial link between the host 102 and the peripheral device 106.

Figure 8:
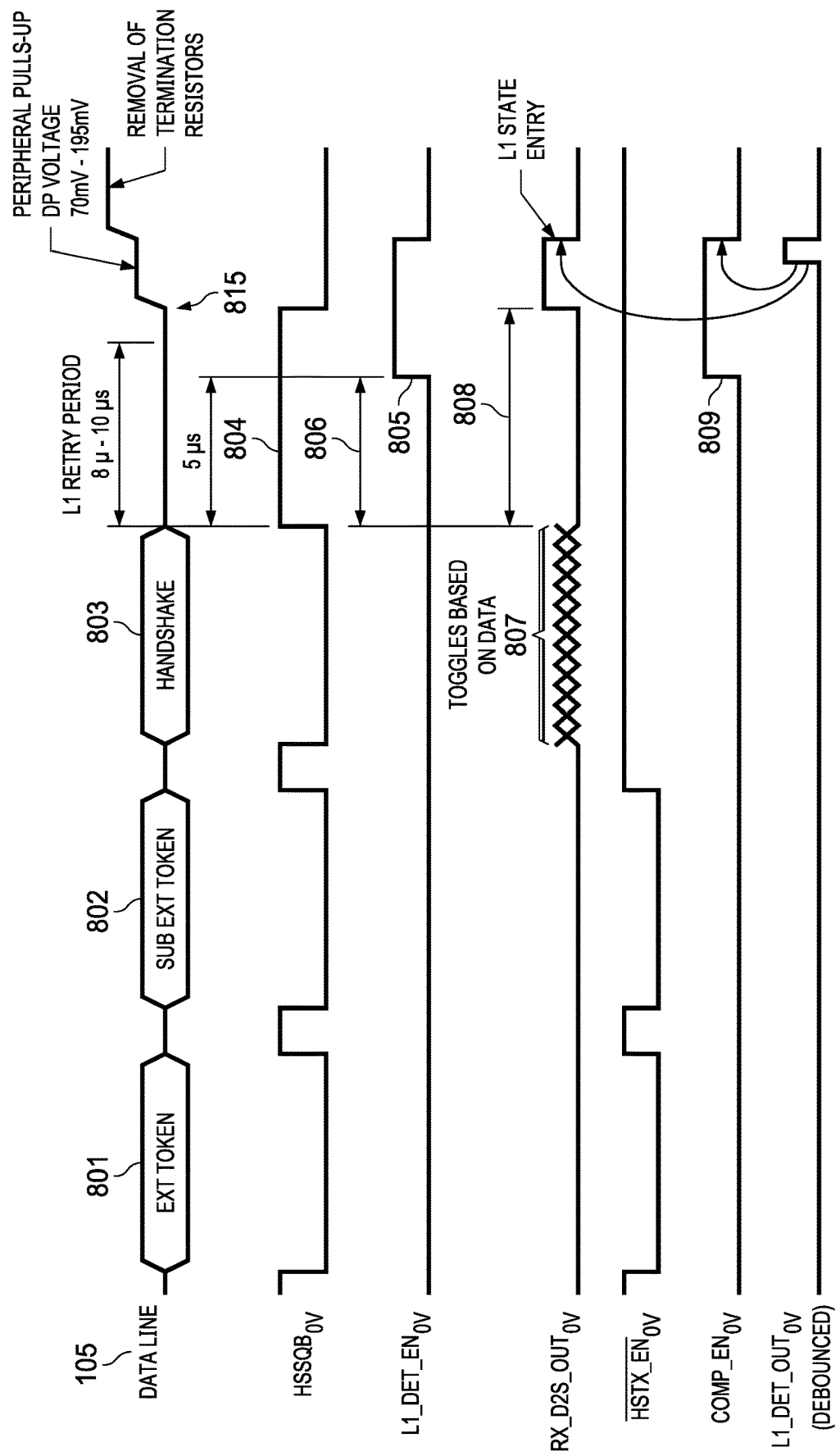
FIG. 8 is a timing diagram illustrating the operation of the power state change detection circuit in accordance with an example embodiment.

FIG. 8 is a timing diagram of various signals in FIG. 7. The signals in FIG. 8 include the differential link 105 coupled between the repeater 104 and the peripheral device 106. A token packet 801, an extended token packet 802, and a handshake packet 803 are illustrated in succession. The host 102 transmits the token and extended token packets 801 and 802 to the peripheral device 106, and the peripheral device 106 responds with the handshake packet 803. The squelch B circuit 623 forces the HSSQB signal low upon detection of packets 801, 802, and 803, and forces HSSQB high otherwise. For example, HSSQB is high at period 804 following the end of the handshake packet 803 indicating that the squelch B circuit 623 is not detecting any valid signals on the link 105 at that time.

The packet timer 722 in FIG. 7 measures the duration of each packet received by the serial bus repeater 104. In one example, the packet timer circuit 722 includes a counter that is incremented by a clock signal (CLK) over an interval during which a packet is received by the serial bus repeater 104 to measure packet duration. With packets 801 and 802 being token/extended token packets, packets 801 and 802 are of equal length (e.g., each is 3 bytes in length). As a handshake packet, packet 803 is one byte in length as provided by the USB 2.0 specification and the LPM addendum thereto. The packet timer 722 measures the duration of each of packets 801-803, and all other packets received by the serial bus repeater 104.

The packet timer 722 provides packet duration measurements to the packet sequence identification circuit 724. The packet sequence identification circuit 724 examines the packet duration measurements to determine a timing signature of a series of sequential packets that is indicative of a power state transaction. The packet sequence identification circuit 724 classifies the packet duration measurements as being indicative of a power state transaction or not indicative of a power state transaction.

For example, any packet duration longer than the predetermined duration of a token packet is not indicative of a power state transaction. If the packet sequence identification circuit 724 receives a first packet duration measurement having a value corresponding to the predetermined duration of a token packet (e.g., packet 801), then the packet sequence identification circuit 724 then examines the packet duration of the immediately subsequent packet. If the subsequent packet duration value received immediately subsequent to the first packet duration value also has a value corresponding to the predetermined duration of an extended token packet (e.g., packet 802), then identification of a packet state transaction continues. If, on the other hand, the second packet duration value does not have a value corresponding to the predetermined duration of a token packet, then the series of packets is not a power state transaction, and identification of a power state transaction using the current packet series is discontinued.

If the first and second packet duration values have values corresponding to the predetermined durations of token packets, and if a third packet duration value received immediately subsequent to the second packet duration value has a value corresponding to the predetermined duration of a handshake packet (e.g., packet 803), then a possible packet state transaction has been identified, and the packet sequence identification circuit 724 activates its output signal L1_DET_EN to the logic circuit 730. Unless gated off by AND gate 734 and/or 754 (explained below), assertion of signal L1_DET_EN high causes signal COMP_EN to be asserted high to thereby enable the comparator 760. If the third packet duration value does not have a value corresponding to handshake packet, then the series of packets is not a power state transaction, and identification of a power state transaction using the current packet series is discontinued. In FIG. 8, the activation of the L1_DET_EN signal commences with rising edge 805. The packet sequence identification circuit 724 asserts L1_DET_EN high following a time duration of 806 following the end of the handshake packet 803 to ensure that no other packets are communicated between host and peripheral device before the repeater configures its termination resistors for the L1 state. The time duration 806 is shorter than the retry period provided for by the USB specification. The retry period is a time period during which the host can retry the token packets if it does not receive an acknowledgment from the peripheral device confirming entry into the L1 state. The USB specification includes a retry period of 8-10 microseconds after which the host and peripheral devices reconfigure their respective termination resistors. The time duration 806 is long enough to permit the repeater to detect any packets on the links (which should not exist if the host and peripheral devices are about to enter the L1 state) but short enough to ensure that the repeater's comparator 760 is enabled before time point 815 at which the peripheral device 106 changes its termination resistors as shown in FIG. 4. In one example, time duration 806 is approximately 5 microseconds.

Unless either or both of inputs 751 or 754 of AND gates 734 or 735, respectively, are low, signal L1_DET_EN being asserted high causes signal COMP_EN to be asserted high and the comparator 760 to be enabled. In response to data signals detected on links 103 or 105, the logic circuit 730 prevents the COMP_EN signal from enabling comparator 760 even if L1_DET_EN is high. Thus, logic circuit 730 functions to "gate off" the L1_DET_EN signal if data signals are detected on link 103 or 105 to avoid enabling the comparator 760.

The transmit TX_EN signal coupled to the input 754 of AND gate 735 within the B portion's power state change detection B circuit 621 is the transmit enable signal generated by the squelch A circuit 613 within the A portion of the repeater 104. The transmit TX_EN signal is high when the squelch A circuit 613 does not detect data signals on link 103, and is low when the squelch A circuit 613 detects data signals on the link 103. Detection of data signals on link 103 indicates that the host 102 is attempting to transmit a data packet to the peripheral device 106. That signal TX_EN is low when the power state transaction identification circuit 720 has identified a sequence of packets (e.g., packets 801-803) that is potentially indicative of a power state transition indicates that the power state transaction identification circuit 720 incorrectly determined that the sequence of packets was for a power state transition. Accordingly, the comparator 760 should not be enabled. In response to the transmit TX_EN signal being low, AND gate 735 forces COMP_EN to remain low thereby preventing comparator 760 from being enabled.

It is also possible that the peripheral device 106 attempts to send a packet to the host 102 when the packet state identification circuit 720 has asserted L1_DET_EN high. That peripheral device 106 transmits a packet when the power state transaction identification circuit 720 has otherwise identified a sequence of packets (e.g., packets 801-803) that is potentially indicative of a power state transition means that the power state transaction identification circuit 720 incorrectly determined that the sequence of packets was for a power state transition. To detect this condition, the logic circuit 730 uses the HSSQ and RX_D2S_OUT signals. The RX_D2S_OUT signal toggles with each bit transition within the serial bus data. For the B portion's power state change detection B circuit 621, the B portion's RX B receiver 622 toggles the RX_D2S_OUT signal (RX_D2S_OUTB) responsive to detected bit changes within the serial bus data received from the peripheral device 106 over link 105.

Reference numeral 807 in FIG. 8 illustrates the RX_D2S_OUT toggling responsive to the peripheral device 106 transmitting the handshake packet 803 back to the host 102. In FIG. 8, the RX_D2S_OUT is logic low after the end of the handshake packet 803 (identified by time portion 808). That the RX_D2S_OUT signal is logic low during this time portion indicates that the peripheral device 106 is not transmitting a packet through the repeater 104 to the host 102. Since RD_D2S_OUT is low during this period, AND gate 733 outputs a logic low to the clock inputs of the flip-flops 736 and 737. With their clocks held low, the flip-flops 736 and 737 do not clock and thus their Q outputs remain at logic low (the Q outputs were/are low due to the reset signal, L1_DET_EN having been low during the packets 801-803). However, if the peripheral device 106 were to send a packet through the repeater 104, the B portion's squelch B circuit 623 will assert HSSQB (HSSQ in FIG. 8) logic low which, through inverter 731, results in a logic high on the input 758 of the AND gate 733. Further, each time RX_D2S_OUT transitions between a high logic low and a low logic level, the output of AND gate 733 transitions between high and low logic levels thereby clocking the flip-flops 736 and 737. The first time the flip-flops are clocked, a logic high is clocked through flip-flop 736 (due to a logical high signal being applied to the D input of flip-flop 736) to the D input of flip-flop 737. A subsequent clocking of the flip-flops (due to another logic level change of serial data on link 105) causes the Q output of flip-flop 737 to become logic high. The logic high signal from the Q output of flip-flop 737 is inverted to logic low by inverter 732 and thus provides a logic low to input 751 of AND gate 734, thereby forcing COMP_EN to remain low and maintaining the comparator 760 in a disabled state.

Responsive to L1_DET_EN being asserted high at rising edge 805, COMP_EN is asserted high at rising edge 809. With the comparator 760 being enabled, if data is then communicated across link 725, then the comparator output will also toggle resulting in an incorrect entry into the L1 state. The FSMs 635 and 645 include debounce logic to determine if the asserted L1_DET_EN signal remains high for a threshold period of time (e.g., approximately 1 microsecond) which is long enough to ensure that the host and peripheral devices have transitioned to the L1 state. The debounce logic eliminates a false L1 detection due to data toggling or noise on the link. In one example, the debounce logic in each FSM includes a timer that counts pulses of a clock to ensure that the L1_DET_EN signal remains high for at least a predetermined number of clock pulses (e.g., 1 microseconds).

With the comparator 760 enabled, if the differential voltage between the P and M lines of link 725 is greater than the comparator's threshold (e.g., approximately 50 mV), which is indicative of the termination resistors within the device 106 being configured for the L1 state as explained above, comparator 760 asserts its output signal L1_DET_OUT to a logic high level. L1_DET_OUT being logic high causes the power state change detection B circuit 621 to assert the control signals to the switches SW61A-SW65A and SW61B-SW65B to the states that configures the termination resistors of the repeater 104 as show in FIG. 3. That is, switches SW61A, SV64B, and SWV65B are closed, and switches SW62A-SW65A and SW61B-SWV63B are opened. In this configuration, resistor R61A (e.g., approximately 1.5 kohms) is electrically coupled between the P line of link 103 and VDD, the M line of link 103 is left floating, and the P and M lines of link 105 are electrically coupled to ground 111 by, for example, approximately 15 kohm resistors.

However, if the differential voltage between the P and M lines of link 725 is less than the threshold, which is indicative of the termination resistors within the device 106 still being configured for the L0 state (no transition between the L0 and L1 states has occurred), comparator 760 asserts its output signal L1_DET_OUT to a logic low level. L1_DET_OUT being logic low causes the power state change detection B circuit 621 to assert the control signals to the switches SW61A-S65A and SW61B-SW65B to the states that configures (or maintains the configuration unchanged) the termination resistors of the repeater 104 as show in FIG. 2 (L0 state). That is, switches SW62A, SV63A, SW62B, 63B are closed (or remain closed), and switches SW61A, SW64A, SW65A, SW61B, SW64B, and SW65B are opened (or remain open). In this configuration, all of the P and M lines on links 103 and 105 have pull-down resistors of 45 ohms to ground.

Figure 9:
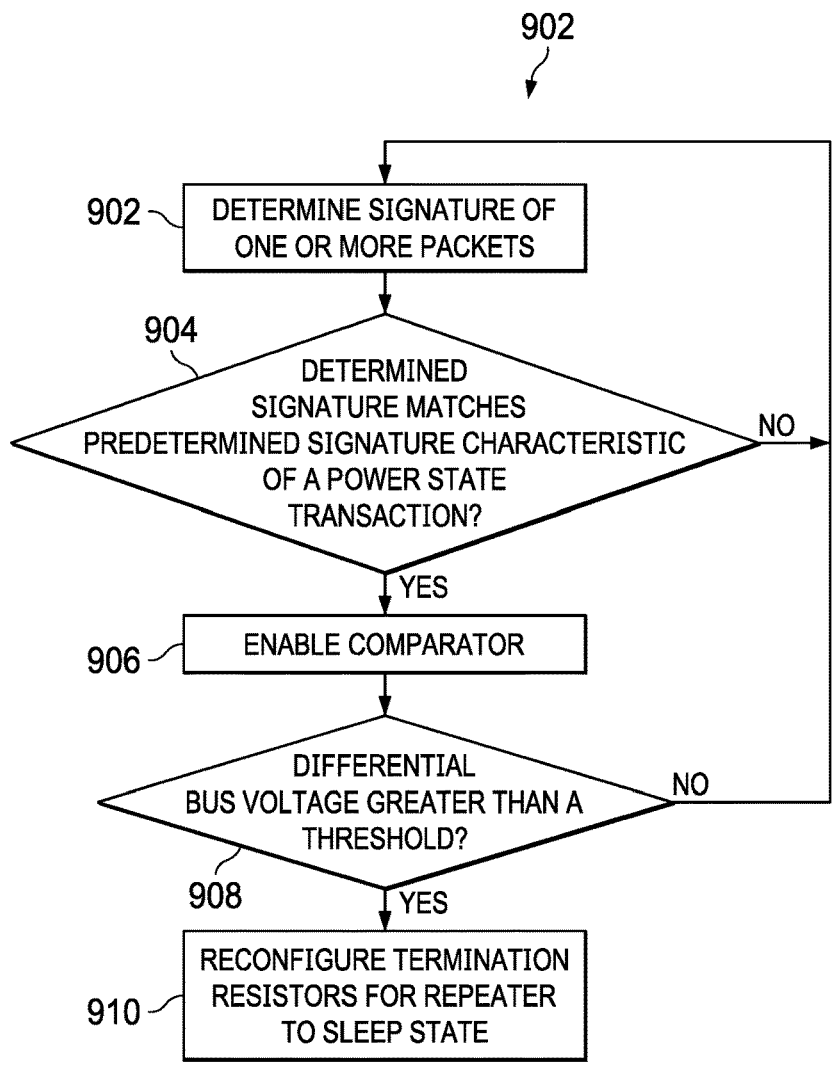
FIG. 9 is a flowchart depicting a method implemented by the power state change detection circuit in accordance with an example embodiment.

FIG. 9 is a flow chart depicting an illustrative method 900 in accordance with the disclosed embodiments. At 902, the method includes determining a signature of one or more packets. As described herein, determining the signature includes determining the time duration of each packet passing through the serial bus repeater 104 (e.g., by the packet timer 722). At 904, the method includes determining whether the signature matches the expected time durations of a token packet, an extended token packet, and a handshake packet. If a sequence of three packets does not have time duration signature matching that of a power state transition, control loops back to step 902, and the next rolling set of three packets is examined for match to a power state transition.

If the signature matches the expected time durations of the three packets forming a power state transit 906 (token, extended token, and handshake packets), at 906 the method includes enabling a comparator (e.g., comparator 760). As explained above, the comparator may not be enabled even if the signature matches a power state change sequence of packets due to detected data on either or both of links 103 and 105.

At 908, the method includes determining whether the differential bus voltage on the link 105 between the repeater 104 and the device 106 is greater than a threshold (e.g., 50 mV). If the differential bus voltage is not greater than the threshold, then control loops back to step 902 and thus without changing the termination resistors within the serial bus repeater 104. However, if the differential bus voltage is greater than the threshold, then at step 910 the method includes the serial bus repeater 104 reconfiguring its termination resistors for the newly detected power state (e.g., Sleep).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A bus repeater, comprising:
   a first bus port adapted to be coupled to a first device;
   a second bus port adapted to be coupled to a second device;
   a first termination resistor network coupled to the first bus port;
   a second termination resistor network coupled to the second bus port;
   a power state change detection circuit including a comparator having a first input, a second input, an enable input and an output, the first and second inputs of the comparator directly connected to the second bus port, and the power state change detection circuit configured to:
      detect a power state change initiated by the first device, in which detection of the power state change includes a determination, by the comparator, that a voltage on the second bus port exceeds a threshold; and
      responsive to detection of the power state change, cause a change in a configuration of at least one of the first or second termination resistor networks.

2. The bus repeater of claim 1, wherein the second bus port is a differential bus port comprising first and second conductors, and wherein the power state change detection circuit includes:
   a power state transaction identification circuit having an input coupled to the first bus port, the power state transaction identification circuit configured to measure a time duration of each packet on the first bus port.

3. The bus repeater of claim 2, wherein the power state transaction identification circuit includes a timer coupled to a packet sequence identifier, the timer configured to measure the time duration of each packet to and to provide a value indicative of the time duration to the packet sequence identifier.

4. The bus repeater of claim 3, wherein the packet sequence identifier has an output, and wherein the comparator has an enable input, and the power state change detection circuit further comprises a logic circuit having a first input and an output, the first input of the logic circuit coupled to the output of the packet sequence identifier, and the output of the logic circuit coupled to the enable input of the comparator.

5. The bus repeater of claim 4, wherein the logic circuit includes:
   a first flip-flop having an input and an output; and a
   a second flip-flop having an input and an output, the output of the first flip-flop coupled to the input of the second flip-flop; and
   a logic gate having first and second inputs and an output, the first input of the logic gate is the first input of the logic circuit, the output of the second flip-flop is coupled to the second input of the logic gate, and the output of the logic gate is coupled to the enable input of the comparator.

6. The bus repeater of claim 4, further including:
   a squelch circuit having a squelch circuit output coupled to the logic circuit, the squelch circuit is configured to generate a squelch circuit output signal responsive to a magnitude of an envelope of a voltage on the second bus exceeding a threshold; and
   a receiver having a receiver output coupled to the logic circuit, the receiver generating a receiver output signal on the receiver output responsive to detection of signals on the second bus port;
   wherein the logic circuit generates a signal on the output of the logic circuit to disable the comparator responsive to both the squelch circuit output signal exceeding the threshold and the receiver's output signal indicating signals on the second bus port.

7. The bus repeater of claim 1, wherein the power state change detection circuit comprises:
   a first logic gate having a first input and an output the output of the first logic gate coupled to the enable input of the comparator;
   a timer coupled to the first bus port, the timer having an output, and the timer configured to determine time duration of packets on the first bus port and to generate values indicative of time duration on the timer's output; and
   a packet sequence identification circuit having an input and an output, the input of the packet sequence identification circuit coupled to the output of the timer, and the output of the packet sequence identification circuit coupled to the first input of the first logic gate.

8. The bus repeater of claim 7, wherein the first logic gate has a second input, and wherein the power state change detection circuit further includes a flip-flop having an output coupled to the second input.

9. The bus repeater of claim 1, wherein the power state change detection circuit is a first power state change detection circuit, and the bus repeater includes a second power state change detection circuit configured to detect the power state change initiated by the device coupled to the second bus port, detection of the power state change by the second power state change detection circuit includes a measurement of a voltage on the first bus port.

10. The bus repeater of claim 1, further including a finite state machine, and wherein the power state change detection circuit is configured to assert a detection signal to the finite state machine, and the finite state machine responds to the asserted detection signal by changing the configuration of the at least one of the first or second termination resistor networks.

11. A circuit adapted to be included in a repeater having termination resistors, the circuit comprising:
   a power state transaction identification circuit having a first input adapted to be coupled to a first bus link, the power state transaction identification circuit configured to measure time duration of packets on the first bus link and to assert a detect enable signal responsive to time durations of a sequence of packets corresponding to predetermined time values;
   a comparator having inverting and non-inverting inputs adapted to be coupled to a second bus link; and the comparator having an enable input;
   logic coupled between the power state transaction identification circuit and the enable input, the logic configured to assert an enable signal to the enable input responsive to assertion of the detect enable signal; and wherein, the comparator is operable, responsive to assertion of the enable signal, to output a signal indicative of a power state change responsive to a differential voltage applied to the inverting and non-inverting inputs being greater than a threshold, the signal operable to cause a change to a configuration of the termination resistors.

12. The circuit of claim 11, wherein the power state transaction identification circuit includes a timer and a packet sequence identifier coupled to the timer, the timer configured to measure the time durations of the packets on the first bus link and to provide values indicative of the time durations to the packet sequence identifier.

13. The circuit of claim 12, wherein the packet sequence identifier determines whether the time durations of a consecutive sequence of packets corresponds to a power state change to a sleep state.

14. The circuit of claim 11, wherein the second bus link is a differential bus having a first bus terminal and a second bus terminal, and wherein the comparator is configured compare a voltage of the first bus terminal to a voltage of the second bus terminal.

15. The circuit of claim 11, wherein the logic includes:
   a first flip-flop having an input and an output; and a
   a second flip-flop having an input and an output, the output of the first flip-flop coupled to the input of the second flip-flop; and
   a logic gate having first and second inputs and an output, the first input of the logic gate is the first input of the logic circuit, the output of the second flip-flop coupled to the second input of the logic gate, and the output of the logic gate is coupled to the enable input of the comparator.

16. The circuit of claim 15, wherein the logic gate is an AND gate.

17. A method of operating a repeater coupled to a first device via a first differential link and coupled to a second device via a second differential link, the method comprising:
   determining a timing signature of packets communicated between a first device and a second device;
   determining that the timing signature matches a predetermined signature corresponding to a power state transition to a sleep state for the first and second devices;
   responsive to determining that the timing signature matches the predetermined signature, enabling a comparator having an input adapted to be coupled to the second differential link and having an output;
   determining, by the comparator, that a voltage on the second differential link exceeds a threshold and asserting the output of the comparator responsive to determining that the voltage on the second differential link exceeds the threshold; and
   reconfiguring termination resistors within the repeater for the sleep state responsive to the asserting the output of the comparator.

18. The method of claim 17, wherein the first device is a host device and the second device is a peripheral device, and the method includes determining that the voltage on the second differential link exceeds the threshold.

19. The method of claim 17, wherein the second differential link is included in a Universal Serial Bus.

20. The method of claim 17, further comprising, responsive to both determining that the timing signature matches the predetermined signature and detecting a packet on the link, disabling the comparator.

* * * * *